United States Patent [19]

Bennett et al.

[11] Patent Number: 4,463,297

[45] Date of Patent: Jul. 31, 1984

[54] CONTROLLER FOR MECHANICALLY ACTUATED DEVICE

[75] Inventors: R. James Bennett, Laurel; Robert A. Phillips, Crownsville, both of Md.

[73] Assignee: Westinghouse Electric Corp., Pittsburgh, Pa.

[21] Appl. No.: 433,051

[22] Filed: Oct. 5, 1982

[51] Int. Cl.[3] .............................................. G05B 13/00

[52] U.S. Cl. .................................... 318/561; 318/584; 318/580; 318/627; 364/424; 343/457

[58] Field of Search ............... 318/561, 584, 585, 580, 318/654, 626, 627, 616; 364/434, 424; 343/757

[56] References Cited

U.S. PATENT DOCUMENTS

| | | | |
|---|---|---|---|
| 4,092,716 | 5/1978 | Berg et al. | 318/580 |
| 4,123,757 | 10/1978 | Lapp et al. | 318/627 X |
| 4,132,939 | 1/1979 | Kameyama et al. | 318/627 |
| 4,138,661 | 2/1979 | McAdams et al. | 318/654 X |
| 4,193,059 | 3/1980 | Harris | 318/654 X |
| 4,196,473 | 4/1980 | Chea | 318/580 |
| 4,261,537 | 4/1981 | Frosch et al. | 318/584 |
| 4,345,195 | 8/1982 | Griffith et al. | 318/626 X |

*Primary Examiner*—B. Dobeck

*Attorney, Agent, or Firm*—W. G. Sutcliff

[57] ABSTRACT

A controller is described for limiting the rate and acceleration of a device positioned by at least one actuator which responds to a sequence of position commands separated by time intervals incorporating a subtractor for taking the difference of two consecutive position commands to provide a difference signal in vector form, means for determining the magnitude of the difference signal, a comparator for comparing the magnitude of the difference signal with a predetermined value, a switch for coupling the desired position command to the actuator at times the magnitude of the difference signal is less than or equal to the predetermined value, two dividers, two multipliers, an adder and normalizer for providing a new position command between the past command and the desired position command at times the magnitude of the difference signal exceeds the predetermined value. The acceleration is limited after the rate is limited by subtracting the latest position command from the prior position command to determine a new difference signal of the latest time interval which is subtracted from the difference signal of the previous time interval to determine the change in difference signal in vector form between two consecutive time intervals indicative of acceleration. A new position command is arithmetically generated by the use of a comparator, divider, two multipliers, two adders and a normalizer at times the magnitude of the change exceeds a predetermined value to provide a new position command which is both rate limited and acceleration limited. The invention overcomes the problem of actuators driving a device into gimbal stops and provides a means for damping device oscillations about a desired position.

43 Claims, 18 Drawing Figures

CONTROLLER FOR MECHANICALLY ACTUATED DEVICE

GOVERNMENT CONTRACT

The Government has rights in this invention pursuant to Contract No. F33657-75-C-0310 awarded by the Department of the Air Force.

BACKGROUND OF THE INVENTION

1. Field of the Invention

This invention relates to controlling a device mechanically positioned by one or more actuators while limiting the maximum rate and acceleration of the device and more particularly to a controller which modifies the position commands directed to a mechanically scanned antenna to limit the maximum rate and acceleration of the antenna with respect to its supporting structure.

2. Description of the Prior Art

It is necessary to control the rate and acceleration demands on a device positioned by actuators in response to position commands to avoid damage to the device and to improve the performance and settling time. For example, an antenna on an aircraft may be directed at a target while the airplane is undergoing maneuvers such as a roll. Position commands to keep the antenna directed at the target may exceed the rate and acceleration capabilities of the actuators or high torque motors of the antenna causing the antenna to be directed somewhere in space other than at the target or desired position. If excessive rate or acceleration is achieved in trying to redirect the antenna to a desired position, the antenna may inadvertently hit or be driven into gimbal stops which may damage the antenna. Also, if the rate and acceleration of the antenna is not properly controlled, antenna performance may be degraded by oscillations of the antenna about a desired pointing direction or by excessive time in reversing the antenna direction. Radar acquisition time of a target can be lengthened by these physical oscillations. Oscillations of the antenna have been damped out in some prior art airborne radar systems by using fluid drive actuators to position the antenna.

In antenna drive systems of the prior art, gimbal limits in azimuth and elevation were provided to ensure that the antenna was positioned within predetermined angle limits. For example, FIG. 8 of U.S. Pat. No. 3,924,235, which issued on Dec. 2, 1975 to Robert I. Heller et al. and assigned to the assignee herein shows gimbal limits for a reflector of a cassegrain antenna system driven by an antenna drive unit 18 in FIG. 1.

In addition to having boundary limits for the operation of the antenna, a rate limit in azimuth was imposed to further prevent the antenna from hitting gimbal stops during dynamic maneuvers of the aircraft.

In addition, a reduced gimbal limit boundary has been imposed in prior systems to serve as a buffer zone or safety margin to prevent the antenna from striking the gimbal stops and mechanically damaging the antenna. The reduced gimbal limit boundary provides an undesirable trade-off between scan coverage by the antenna and protection of the antenna from damaging itself.

One example of an aircraft maneuver which imposes high dynamic rates on the antenna drive unit is when an airplane may be moving in the direction of its longitudinal axis while undergoing a roll, for example, 180° about the longitudinal axis. If the antenna is tracking a target at an angle off the longitudinal axis of the aircraft and close to the gimbal limits of the antenna prior to the roll maneuver, the antenna will move in an arc relative to its supporting members attached to the air frame as the airplane rolls. If the airplane rolls slowly, the antenna will track the target during the roll maneuver by the aircraft. As the pilot increases the rate of roll, the antenna will be driven faster and harder to maintain the antenna on the target. With increasing roll rate of the aircraft as controlled by the pilot, the antenna will fall behind the desired position of the target and will be driven harder to catch up to the target. The rate and acceleration of the antenna can exceed its mechanical control capabilities and the antenna may be driven into a gimbal stop due to its excessive velocity or due to the fact that the true position of the antenna is unknown since it already is lagging behind the desired position. When the pilot terminates a roll operation and the antenna catches up or reaches the desired position, the antenna velocity may carry the antenna beyond the desired point causing the antenna to oscillate about the point as it is driven in the direction of the desired point or target.

The antenna drive system may be an open loop system where the antenna is the recipient of a sequence of position commands without any feedback as to where the antenna is actually pointing prior to a position command. Alternatively, an antenna may have syncros positioned on the gimbal axes to determine accurately where the antenna is pointing. Normally in operation, the antenna pointing direction is determined in reference to target reflected signals which indicate the relationship of the antenna beam directed at the target and the line-of-sight of the target. In this situation, syncros would merely be helpful during dynamic maneuvers of the aircraft where the antenna is unable to be where it is commanded.

The path of a device such as a robot may be controlled by describing the path by a sequence of spaced-apart points to form line segments of equal length between the points. Precise control along the line segments is provided by interpolating additional points along the straight line segments for controlling the device along the straight line segments. U.S. Pat. No. 3,943,343, which issued on Mar. 9, 1976 to Akiyoshi Irie, entitled "Program Control System for Manipulator" describes such a system in FIGS. 3, 5A and 5B.

It is therefore desirable to provide a controller to control the path of an antenna or other device in an optimal manner by utilizing the sequence of position commands to derive direction and distance information.

It is further desirable to limit both the rate and acceleration demands on actuators such as the azimuth and elevation servos.

It is further desirable to smoothly slow a device with its oscillations damped before passing a desired point or a gimbal boundary by adjusting the rate and acceleration limits.

It is further desirable to control the path of a device without requiring the generation of trigometric functions to determine the path with respect to azimuth and elevation directions, for example.

It is further desirable to stop a device such as an antenna before reaching a selected point instead of passing the point to build up an error signal to stop the antenna.

It is further desirable under severe dynamic conditions such as when an airplane rolls, that the antenna is steered on an optimum recovery path away from gimbal boundaries and in the direction of the desired point.

It is further desirable that the controller would modify the antenna position commands only at times when acceptable rates and accelerations exceed desired levels.

It is further desirable to direct the path of a device such as an antenna along a shortened route within acceptable rates and accelerations to reach a desired position.

SUMMARY OF THE INVENTION

In accordance with the present invention, apparatus and methods are described for controlling a device mechanically positioned by actuators in response to a sequence of position commands which may at times exceed predetermined rate limits of the device by subtracting two consecutive position commands to provide a difference signal indicative of direction and distance, comparing the magnitude of the difference signal with a predetermined constant and coupling the latest position command to the actuator at times the magnitude of the difference signal is less than the predetermined constant, and at other times generating a first signal as a function of the magnitude of the difference signal, multiplying the difference signal by the first signal to provide a smaller difference signal, adding the smaller difference signal to the first direction signal to form a third direction signal, adjusting the magnitude of a third direction signal to a predetermined magnitude, and coupling the third direction signal to the actuators at times the magnitude of the difference signal is greater than the predetermined constant.

The invention further provides an apparatus and method for limiting the acceleration of a device mechanically positioned by at least one actuator in response to a sequence of position commands comprising the steps of receiving first, second and third consecutive position commands at predetermined time intervals, converting the first, second and third commands to first, second and third direction signals having a predetermined magnitude, subtracting the first and second direction signals to provide a first difference signal indicative of the change in position during said predetermined time interval, subtracting the second and third direction signals to provide a second difference signal indicative of the change in position during said predetermined time interval, subtracting the first and second difference signals to provide a first acceleration signal, comparing the magnitude of the first acceleration signal with a predetermined constant, coupling the third direction signal to the actuator at times the magnitude of the first acceleration signal is less than the predetermined constant, generating a first scaling signal as a function of the magnitude of the first acceleration signal, multiplying the first acceleration signal by the first scaling signal to provide a smaller first acceleration signal, adding the smaller first acceleration signal to the first difference signal to form a third difference signal, adding the third difference signal to the second direction signal to form a fourth direction signal, arithmetically adjusting the magnitude of the fourth direction signal to a predetermined magnitude, and coupling the fourth direction signal to the actuator at times the magnitude of the first acceleration signal is greater than the predetermined constant.

The invention further provides a method for limiting the acceleration of a device mechanically positioned by at least one actuator in response to a sequence of position commands by taking the difference of consecutive position commands to determine the velocity between consecutive positions, taking the difference of the velocity between three adjacent time intervals to determine the change in acceleration passing from a first time interval to a second and from a second to a third, comparing the change in acceleration with a predetermined limit value. The third position command may be used if the acceleration is less than the limit value and a new third position command may be generated if the acceleration value is exceeded. The new position command is positioned closer to the second position command so that the acceleration is reduced to be equal to or less than the maximum acceleration limit.

DESCRIPTION OF THE PREFERRED EMBODIMENT

Figure 1:
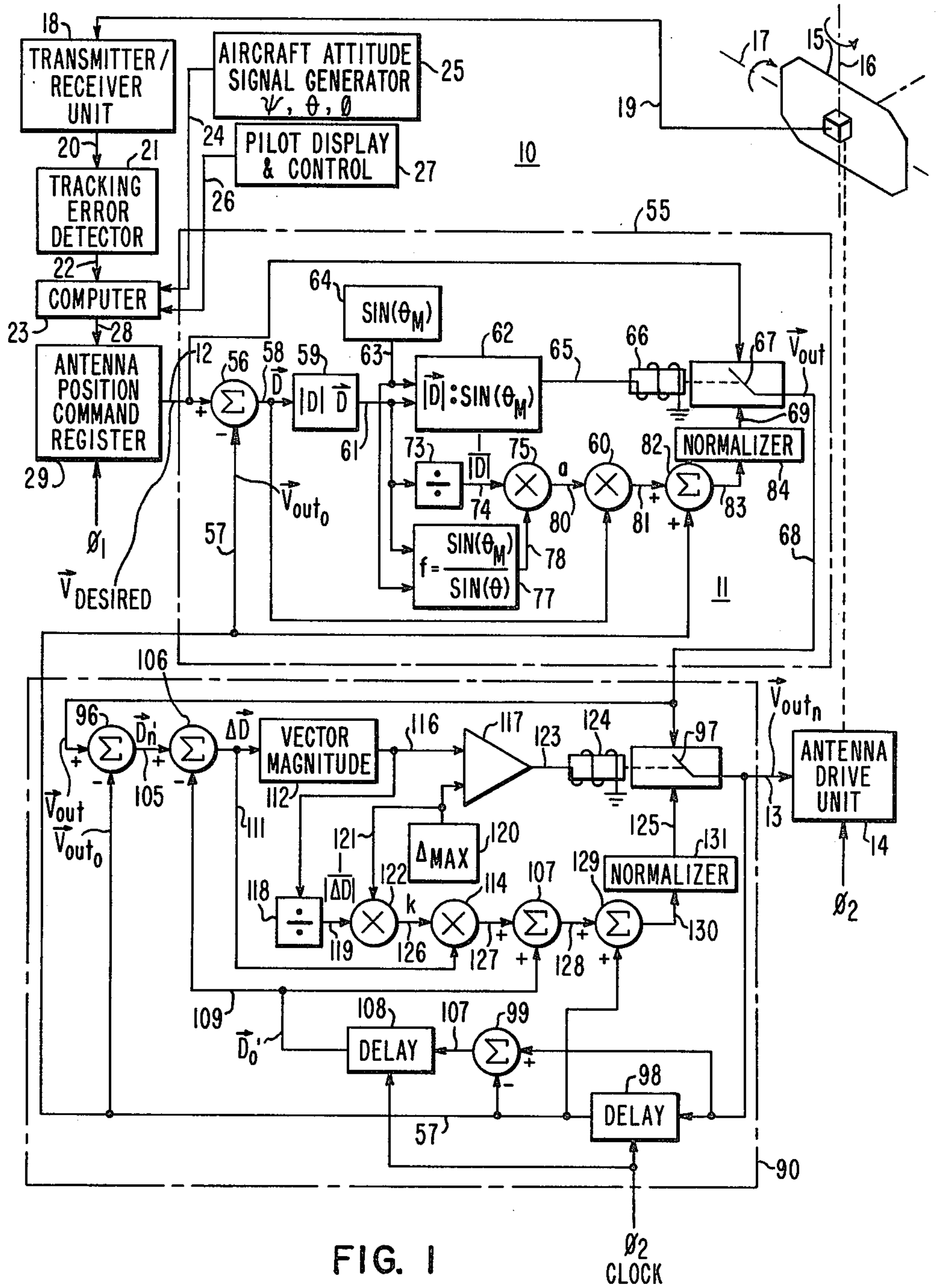
FIG. 1 is a block diagram of one embodiment of the invention.

Referring to the drawing, and in particular, to FIG. 1, a radar 10 is shown in block diagram form comprising a controller 11 which receives antenna position commands from antenna position command register 29 over line 12. Controller 11 functions to provide antenna position command signals on output line 13 to an input of antenna drive unit 14. Antenna drive unit 14 functions to position antenna 15 in azimuth and elevation with respect to axes 16 and 17, respectively, in response to position commands on line 13. Axes 16 and 17 may be referenced with respect to the supporting structure of the antenna or the antenna drive unit 14, for example, such as by gimbals. Controller 11 functions to limit the spacing and direction of position commands occuring at predetermined time intervals such that antenna 15 is controlled in its velocity and acceleration with respect to the antenna drive unit 14.

FIG. 1 shows other components of a typical radar which function in a normal manner such as transmit receive unit 18 which is coupled over line 19 to antenna 15. Transmit/receive unit 18 is coupled over line 20 to an input of tracking error detector 21 which functions to determine the angle between the boresight of antenna 15 and the line-of-sight to the target. The angles $\epsilon_A$ and $\epsilon_E$ are fed over line 22 to an input of computer 23.

Computer 23 is supplied with information over line 24 from aircraft attitude signal generator 25 which supplies the aircraft attitude information, angles $\psi$, $\theta$ and $\phi$ to computer 23 with respect to a stable coordinate system such as north, east, south and west. Computer 23 supplies information over line 26 to pilot display and control 27 which enables the pilot to observe the display and operate radar 10. Computer 23 functions to provide a sequence of antenna position commands spaced apart by predetermined time intervals which are coupled over line 28 to antenna position command register 29. It is understood that antenna 15 may be a "non-cassegrain" or a cassegrain antenna system wherein the angle errors supplied from computer 23 to antenna position command register 29 are angles for the reflector of the cassegrain antenna. Reference is made to U.S. Pat. No. 3,924,235, which issued on Dec. 2, 1975, entitled, "Digital Antenna Positioning System and Method" by Robert I. Heller et al. and assigned to the assignee herein which is incorporated herein by reference to show the operation of components of a typical radar system and their structure to provide angles or position commands to an antenna drive unit which positions the antenna or the antenna's reflector if its a cassegrain antenna.

The antenna position commands held in antenna position command register 29 provide the line-of-sight direction for antenna 15 with respect to its gimbal mounting axes 16 and 17. As shown in FIG. 1, antenna 15 has axes 16 and 17 which provide the antenna with two degrees of freedom.

Figure 2:
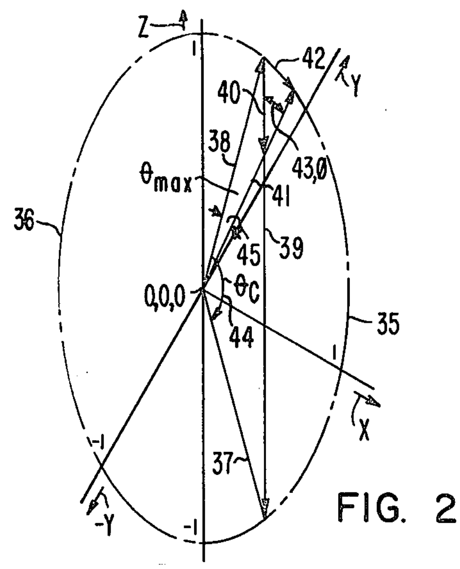
FIG. 2 is a graph illustrating the operation of a portion of FIG. 1.

Referring to FIG. 2, a graph is shown wherein the Z axis can be said to be aligned with axis 16 of the antenna and the −Y coordinate is aligned with axis 17 of antenna 15. The coordinate X is orthogonal to the Y and Z axis. The Y and Z coordinate may be said to be in the plane of antenna 15 and the X coordinate is in the direction of microwave radiation.

The position of antenna 15 may be expressed using the X, Y and Z coordinates. If a vector of unit length is selected, then any direction in space from antenna 15 can be expressed by a point on a hemisphere having its radius of unit length and having its center at the intersection of the X, Y and Z coordinates. The movement of antenna 15 may be expressed by great circle lines or arcs on the hemisphere from point-to-point as the antenna sequences through a plurality of position commands. In FIG. 2, the intersection of the hemisphere with the coordinates X and Z is shown by curve 35 and with coordinates −Y and Z by curve 36. Curves 35 and 36 pass through the value 1 at the X, −Y and Z coordinates.

An antenna position command stored in register 29 at time $T_n$ may be represented as a direction signal having a predetermined magnitude shown in FIG. 2 by arrow or unit vector 37. A previous antenna position command at time $T_{n-1}$ is shown by unit vector 38 in FIG. 2. Vector 37 may be expressed as $V_{DESIRED}$ and vector 38 may be described as $V_{outold}$. The difference between the two vectors 37 and 38 are expressed in equation 1 provides the difference vector D.

$$\vec{D} = \vec{V}_{DESIRED} - \vec{V}_{outold} \qquad (1)$$

The difference vector $\vec{D}$ is shown in FIG. 2 as vector 39. The difference vector 39 points in the desired direction of movement of the antenna and the length of the difference vector 39 is proportional to the rate of movement when examined at small fixed increments of time such as every five milliseconds. If the time increments or time intervals are known between position commands, then the rate of movement of the antenna pointing direction may be controlled by limiting the length of the difference vector 39. For small angles, the distance traversed on the unit sphere is sin $\theta$ which may be approximated by the angle $\theta$ itself expressed in radians. The rate of movement can be controlled by limiting the distance between position commands while the direction is maintained towards the desired position along the great circle of a hemisphere between the two position points.

Referring to FIG. 2, the maximum distance for a given time interval may be expressed as sin $\theta_{max}$. If the magnitude of the difference vector 39 is less than or equal to sin $\theta_{max}$, then the distance travelled in a given time interval will be less than the maximum rate and the position command is acceptable as is to be supplied directly to antenna drive unit 14. If, however, the magnitude of the difference vector 39 is greater than sin $\theta_{max}$, then the length of the difference vector must be shortened or scaled by a factor while the direction of difference vector 39 is preserved. Equation 2 shows that the length f of the difference vector 39 may be determined if the angle $\phi$ is known. $\phi$ is the angle between vector 39 and a unit vector 41 originating at 0,0,0 and passing through vector 39 a distance sin $\theta_{max}$ from the last position command. Sin $\theta_{max}$ had been added to vector 38 and lies on the great circle above vector 39. In FIG. 2 angle $\phi$ is shown by arrow 43 and angle $\theta_{max}$ is shown by arrow 45.

Length f may be calculated using equation (2).

$$\text{Length } f = \frac{\sin \theta_{max}}{\sin \phi} \qquad (2)$$

The value of 1/sin $\phi$ may be approximated by the relationship shown in equation 3.

$$\frac{1}{\sin \phi} = 1 + (|\vec{D}| \times .51424)^4 \qquad (3)$$

The relationship in equation 3 is accurate for small angles $\theta_C$, the angle between unit vectors 37 and 38, and becomes conservative or a little smaller than the actual value when the angle $\theta_C$ is large. Angle $\theta_C$ is shown by arrow 44 in FIG. 2. Length f shown by reference numeral 40 may be divided by the magnitude of the difference vector 39 to provide a scaling factor "a" as expressed in equation 4.

$$a = \frac{f}{|\vec{D}|} \qquad (4)$$

A new position command shown by vector 41 is generated by adding to vector 38 the length f or vector 40 which is normalized to a unit length to form new vector 41. The new position command vector 41 is substituted in place of vector 37 to the antenna drive unit 14 which results in a distance sin $\theta_{max}$ shown by vector 42 travelled by the antenna during the time interval between the old command and the new command. Since a portion of the difference vector, length f, is added to vector 38, the rate of movement of the antenna is uniformly limited in all directions without regard to azimuth or elevation axes 16 and 17.

Referring to FIG. 1, the rate of movement of antenna 15 is determined by rate limiter 55 of controller 11. Adder/subtractor 56 has a first input on line 12 and a second input on line 57 having an output coupled over line 58 to vector magnitude 59 and to a first input of multiplier 60. The output of vector magnitude 59 is coupled over lead 61 to a first input of comparator 62 having a second input coupled over lead 63 to a voltage source 64 having a value indicative of sin $\theta_{max}$. The output of comparator 62 is coupled over lead 65 to one input of solenoid 66 having its other side coupled to ground which is mechanically coupled to a single pole, double throw switch 67. It is understood that solenoid 66 and single pole, double throw switch 67 are shown for illustrative purposes and that field effect transistors or other suitable switching circuits may be used in their place. At times when the voltage on lead 63 exceeds the voltage on lead 61, the output of comparator 62 will be high and switch 67 will be activated to couple line or lead 12 to lead 68. When the voltage on lead 63 is less than the voltage on lead 61, then the output of comparator 62 will be low and switch 67 will have lead 69 coupled to lead 68. Lead 61 is coupled to an input of divider 73 having an output coupled over lead 74 to a first input of multiplier 75. Lead 61 is also coupled to arithmetic unit 77 which has an output coupled over lead 78 to a second input of multiplier 75. Lead 63 is coupled to a second input of arithmetic unit 77. The output of multiplier 75 is coupled over lead 80 to an input of multiplier 60. The output of multiplier 60 is coupled over lead 81 to an input of adder 82. A second signal on lead 57 representative of the old or last position command shown as vector 38 in FIG. 2 is coupled to a second input of adder 82. The output of adder 82 is coupled over lead 83 to an input of normalizer 84. The output of normalizer 84 is coupled over lead 69 to one side of switch 67.

In operation of rate limiter 55, the last position command is provided on line 57 and subtracted from the latest antenna position command by subtractor 56. The output of subtractor 56 is a quantity indicative of the difference between the two commands which may be in vector form or indicative of the direction from the older antenna position command to the latest antenna position command. The magnitude of the difference signal on line 58 is determined by vector magnitude 59 which determines the magnitude of the difference signal on line 58 irrespective of direction. Vector magnitude 59 may, for example, perform the square root of the sum of the squares of the value for each coordinate axis where $\vec{D}$ is a vector. The output of vector magnitude 59 is compared by comparator 62 with a signal indicative of sin $\theta_{max}$, the acceptable length of movement of antenna 15 over a given interval of time. If the difference vector is less than or equal to the length sin $\theta_{max}$ then the output of the comparator 65 will couple lead 68 to lead 12. If the difference vector is greater than sin $\theta_{max}$ indicated by the voltage on lead 63, then the comparator will couple lead 69 to lead 68.

A modified position command is generated by dividing the magnitude of the difference vector into 1 by divider 73. The acceptable portion, length f of the difference vector D is determined in arithmetic unit 77 which determines sin $\theta$/sin $\phi$ to provide an input to multiplier 75. The output of multiplier 75 provides a scaling factor "a" to be multiplied with the difference vector in multiplier 60 to provide a shortened difference vector which is subsequently added to the old position command on line 57 as shown in equation 5.

$$\vec{V}_{out} = \vec{V}_{outold} + a\vec{D} = (V_{1x}, V_{1y}, V_{1z}) \tag{5}$$

$$= \left( \frac{V_{1x}}{\sqrt{V_{1x}^2 + V_{1y}^2 + V_{1z}^2}}, \frac{V_{1y}}{\sqrt{V_{1x}^2 + V_{1y}^2 + V_{1z}^2}}, \frac{V_{1z}}{\sqrt{V_{1x}^2 + V_{1y}^2 + V_{1z}^2}} \right)$$

The new vector on line 83 is normalized by normalizer 84 to provide a unit vector on line 69 which moves the antenna angularly towards the desired position but by a shorter angular distance than the desired angular distance to provide angular rate limiting to antenna 15.

Figure 3A:
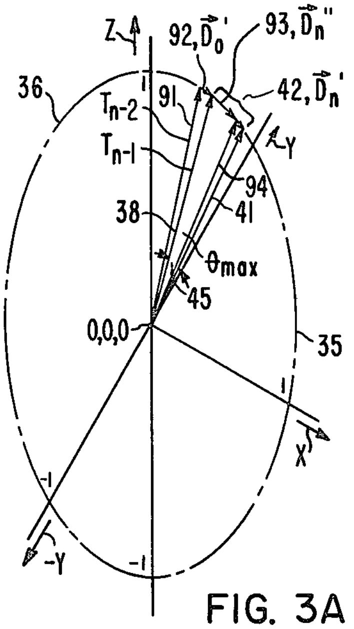
FIGS. 3A through 3G are graphs illustrating the operation of FIG. 1.

The output of rate limiter 55 is supplied to acceleration limiter 90 of controller 11. Acceleration limiter 90 limits the acceleration by limiting the change of velocity of antenna 15 from one time interval to the next. Referring to FIGS. 2 and 3A, the present position command at time $T_n$ is unit vector 41. The past position command at time $T_{n-1}$ is unit vector 38 in FIG. 3A as well as FIG. 2. The difference between unit vectors 38 and 41 is shown in FIGS. 3A and 2 as vector 42. Vector 42 represents the antenna velocity since it represents the change of antenna position during the time interval between the two position commands. An earlier position command at time $T_{n-2}$ is shown in FIG. 3A by unit vector 91. The difference between unit vector 38 and unit vector 91 is shown in FIG. 3A as vector 92. Vector 92 represents the antenna velocity since it represents the distance the antenna travelled between time $T_{n-2}$ and $T_{n-1}$. The length of vector 42, $\vec{D}_n'$, is expressed in equation 6 and the length of vector 92, $D_o'$, is expressed in equation 7.

$$\vec{D}_n' = V_{Tn-1} - V_{Tn} = V_{outold} - V_{out} \tag{6}$$

$$\vec{D}_o' = V_{Tn-2} - V_{Tn-1} \tag{7}$$

Figure 3B:
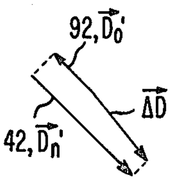

Since the length of each vector 92 and 42 represents angular rate or velocity during two consecutive time intervals, the difference of vector 42 and 92 represents the acceleration of antenna 15 passing from time interval $T_{n-2}$ to $T_{n-1}$ to the time interval from $T_n$ to $T_n$. The acceleration is expressed by equation 8 and shown graphically in FIG. 3B.

$$A = \Delta\vec{D} = \vec{D}_n' - \vec{D}_o' \tag{8}$$

If the acceleration $\Delta\vec{D}$ is less than a predetermined constant $\Delta_{max}$, then the position command at time $T_n$, unit vector 41 is within acceleration limits and vector 41 may be coupled to antenna drive unit 14 through switch 97. If the acceleration $\Delta\vec{D}$ exceeds a predetermined maximum value, $\Delta_{max}$, then the position command at time $T_D$, unit vector 41, should be modified to provide a new position command to bring the acceleration equal to or less than the maximum allowable acceleration.

The magnitude of the acceleration is compared to the magnitude of the maximum acceleration limit $\Delta_{max}$ to provide a scaling factor which is multiplied by the acceleration vector to provide a shortened acceleration vector k $\Delta\vec{D}$ as expressed in equation 9.

$$\vec{D}_n''=\vec{D}_o'+k\Delta\vec{D} \text{ where } k=\Delta_{max}|\Delta\vec{D}|=\Delta_{max}/\vec{D}_n'-\vec{D}_o' \quad (9)$$

Figure 3C:
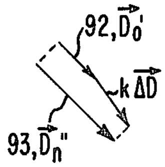

The permissible difference in position or the output of equation 9 is shown by vector 93 in FIGS. 3A and 3C. The difference vector 93 is added to the prior position command vector 38 and normalized to provide a new unit vector 94, $V_{outnew}$ as expressed in equation 10.

$$\overrightarrow{V_{outnew} = V_{outold} + \vec{D}_n''} \quad (10)$$

Figure 3D:
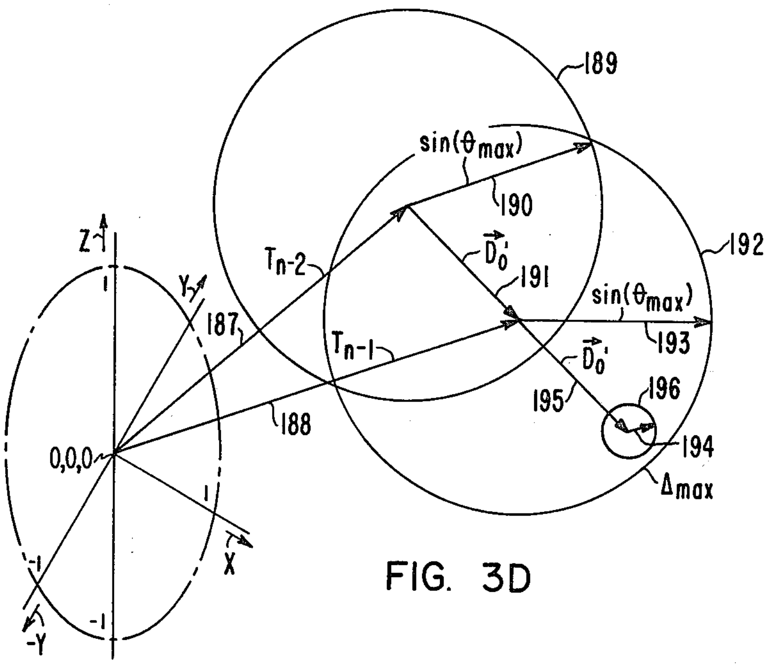

FIG. 3D shows two consecutive unit vectors 187 and 188. Circle 189 having a radius sin ($\theta_{max}$) and a center at unit vector 187 shows the limits for the next unit vector having a rate equal to or less than sin ($\theta_{max}$). Unit vector 188 falls within circle 189 and therefore has an acceptable rate limit. The difference between vectors 187 and 188 is shown by vector 191 which represents the velocity $\vec{D}_o'$. With two prior position commands provided the next position command must fall within acceptable rate limits shown by circle 192 having a radius 193 equal to sin ($\theta_{max}$) originating from unit vector 188. The next unit vector must also be within acceptable acceleration limits expressed by equation (8) where the acceleration must be less than $\Delta_{max}$ shown by a vector 194 added to a vector 195. Vector 195 is equal to vector 191 and originates from unit vector 188. Vector 195 represents the same velocity vector as velocity vector 191 and vector 194 represents the maximum change of velocity. The new vector $\vec{D}_n'$ is allowable so long as it falls within circle 196 having a radius of 194 originating from the end of vector 195. In other words, once vectors 187 and 188 are provided the next unit vector allowable must fall within circle 192 to be adequately rate limited and within circle 196 to be adequately acceleration limited. Circles 189, 192 and 196 fall on the surface of a unit sphere extending from the coordinates X, Y and Z and 0,0,0.

Figure 3E:
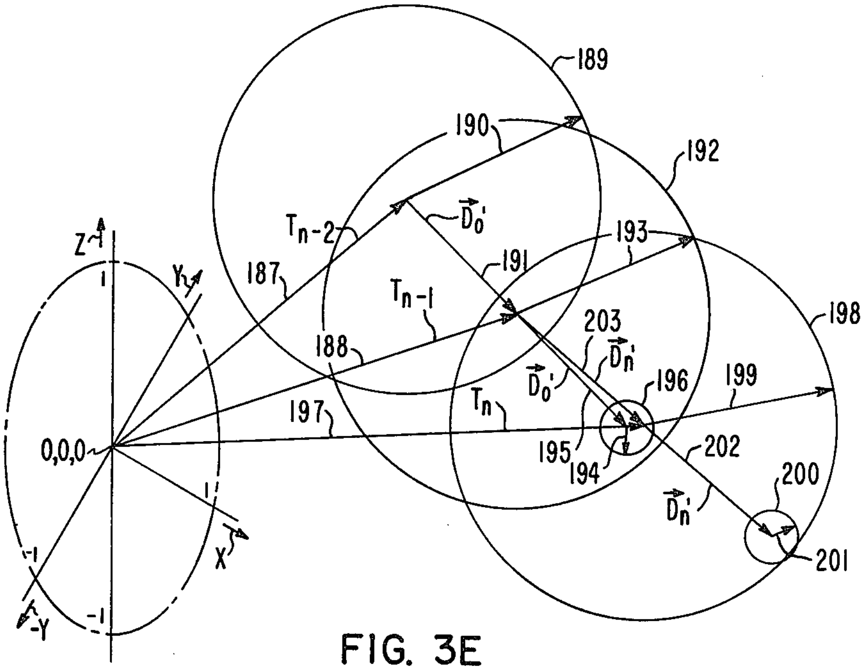

Referring to FIG. 3E, the next position command unit vector 197 occurring at time $T_n$ fell within circle 192 and circle 196 and therefore was acceptable as is. The next position command at time $T_{n+1}$ must first occur within circle 198 having a radius 199 originating from unit vector 197. Radius 199 is equal to sin ($\theta_{max}$). Also, the new position command at time $T_{n+1}$ must fall within circle 200 having the radius shown by vector 201 added to vector 202. Vector 201 or the radius is equal to $\Delta_{max}$ which is the maximum acceleration allowable. The velocity vector between unit vector 188 and 197 is shown by vector 203. Vector 202 is equal to vector 203 but has its origin at unit vector 197. The position at the end of vector 202 represents zero acceleration since the difference of vector 202 from vector 203 would be zero. Vector 201 represents the allowable acceleration, and so long as the next position command falls within circle 198 and within circle 200, no rate or acceleration limiting will be required.

Figure 3F:
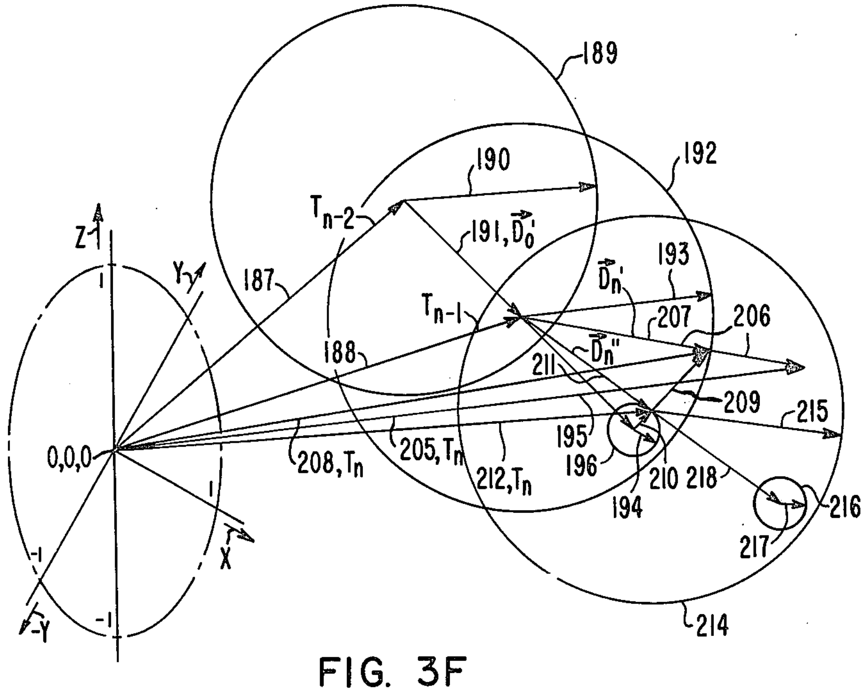

FIG. 3F shows a sequence of position commands where rate and acceleration limiting is required. Unit vector 205 represents the desired position command occurring at time $T_n$. The prior position command unit vector 188 is subtracted from the new position command vector 205 to provide vector 206 which is vector D in equation (1). Since vector 206 exceeds radius 193, vector 206 is shortened by constant A given in equation 4 to provide a shortened vector a$\vec{D}$ 207 which is added to unit vector 188 to provide a new position command 208 in accordance with equation (5). Position command 208 having been rate limited is next tested to see whether it falls within the acceleration limits $\Delta_{max}$. Unit vector 191 is subtracted from unit vector 207 which results in vector 209, ΔD originating from the end of vector 195. Since vector 209 exceeds radius 194, position command 208 must be acceleration limited. A portion of unit vector 210 corresponding to k$\Delta\vec{D}$ is added to unit vector 195 to provide vector 211 $\vec{D}_n''$ in accordance with equation (9). Vector 211 is added to unit vector 188 and normalized to be a new unit vector 212 which is both rate limited, falling within or on circle 192 and acceleration limited, falling within or on circle 196. The next position command subsequent to unit vector 212 must fall within circle 214 having a radius 215 originating from unit vector 212. Radius 215 has a value of sin ($\theta_{max}$). The next position command must fall within or on circle 216 to be acceleration limited which has a radius 217 equal to $\Delta_{max}$ originating at the end of vector 218 which has the same magnitude as vector 211 but is added on to unit vector 212.

Figure 3G:
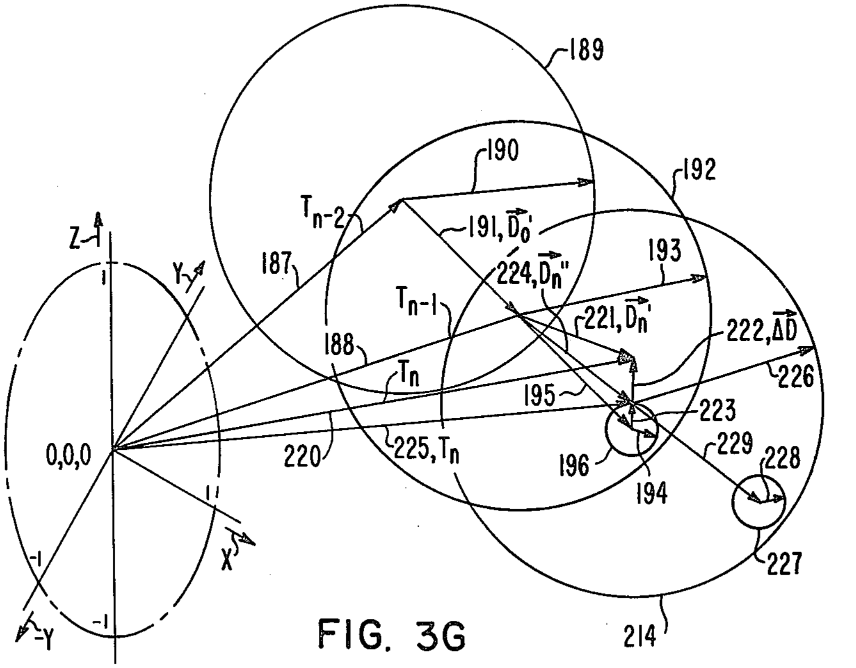

FIG. 3G shows a sequence of position commands where rate limiting is not required but acceleration limiting is required. In FIG. 3G a new position command given by the vector 220 occurs at time $T_n$ which follows position command 188 at time $T_{n-1}$. As can be seen, the end of unit vector 220 is within circle 192 and therefore does not require rate limiting since the change of position is less than sin ($\theta_{max}$) shown by radius 193. Unit vector 220, however, does require acceleration limiting since unit vector 220 is outside circle 196 having a radius 194 representing the acceptable acceleration $\Delta_{max}$. The difference between unit vector 188 and unit vector 220 as given by equation (7) is vector 221. The difference between vector 221 and vector 191 in accordance with equation (8) is vector 222. A constant k times the length of vector 222 yields vector 223 which is a portion of vector 222 and corresponds to a length $\Delta_{max}$ in amplitude and having the direction of vector 222. Adding vector 223 to vector 191 which is the same as vector 195 yields vector 224, $\vec{D}_n''$ in accordance with equation (9). Adding vector 224 to the last position command, vector 188, provides a new position command at time $T_n$, unit vector 225 which meets the acceleration limits $\Delta_{max}$. The next position command must fall within circle 214 having a radius 226 of the value sin ($\iota_{max}$) to be within acceptable rate limits. In addition, the next position command at time $T_{n+1}$ must be within or on circle 227 having a radius 228 of the magnitude $\Delta_{max}$. Radius 228 originates at the end of vector 229 which has the same amplitude and direction as vector 224 which is added at the end of unit vector 225. If the next position command is outside of circle 214 or of circle 227, then rate limiting or acceleration limiting will again need to be applied to derive a position command within both circles 214 and 227. As can be seen from FIG. 3G rate limiting occurs in the direction of the velocity and acceleration limiting occurs in the direction of the acceleration dictated by the original unacceptable position command. It is understood that the locus of points of circles 189, 192, 214, 196 and 227 occur on or close to the surface of a unit sphere originating from coordinates 0,0,0. It is understood that position commands such as unit vectors 187, 188 and 225 are renormalized after calculations so that the unit vector is indeed a unit vector occurring on unit sphere from coordinates 0,0,0.

FIGS. 3A through 3G show that the acceleration is uniformly limited in all directions while the direction of movement of the antenna is always towards the desired position command. The distance towards the desired position command is always some increment of the total distance as expressed by the great circle path on a unit sphere. It is apparent that the approach applied to provide rate limiting and acceleration limiting may be applicable to more generalized situations where the path traversed is no longer along the surface of a unit sphere but along a topological surface which is formed by position vectors in an appropriate coordinate system.

Acceleration limiter 90 shown in FIG. 1 receives a position command at time $T_n$ from rate limiter 55 on line 68 which is coupled to an input of adder 96 and to one side of switch 97 which is a single pole, double throw switch. Switch 97 couples a position command signal on to line 13 as an output of acceleration limiter 90. The position command on line 13 is coupled to an input of delay 98 which may, for example, be a shift register and to an input of adder 99. Delay 98 functions to provide at its output a prior position command signal such as at time interval $T_{n-1}$ set in by clock signal $\phi_2$. The output of delay 98 is coupled over line 57 to an input of adder 99 and to an input of adder 96. Adders 99 and 96 may function as subtractors to take the difference of the two input signals. The output of adder 96 is coupled over line 105 to an input of adder 106. The output of adder 99 is coupled over line 107 to an input of delay 108 which may, for example, be a shift register. The output of delay 108 which may, for example, have a time delay of one time interval, is coupled over line 109 to an input of adder 106 and an input of adder 107. The output of delay 108 represents the difference vector between two position command signals occurring at times $T_{n-2}$ and $T_{n-1}$. The output of adder 96 provides the difference of two position command signals one from the output of rate limiter 55 at time $T_n$ and the other from the output of acceleration limiter 90 at time $T_{n-1}$. The output of adder 106 provides the change between the two difference vectors $\vec{D}_n'$ and $\vec{D}_o'$ and represents the change in rate of antenna 15 from a first time interval to a second time interval. The first time interval corresponding to the interval between time $T_{n-1}$ and $T_{n-2}$. The second time interval corresponds to the time between $T_n$ and $T_{n-1}$. The output of adder 106 is coupled over line 111 to an input of vector magnitude 112 and an input of multiplier 114. Vector magnitude 112 functions to provide the magnitude of the input signal on line 111 which may be in vector form. The output of vector magnitude 112 is coupled over line 116 to an input of comparator 117 and an input of divider 118. The output of divider 118 is coupled over line 119 to an input of multiplier 122. Voltage source 120 which may have a voltage representative of the maximum acceleration, $\Delta_{max}$ is coupled over line 121 to an input of comparator 117 and an input of multiplier 122. The output of comparator 117 is coupled over line 123 to solenoid 124 which activates switch 97. If the signal on line 116 is equal to or less than the signal on line 121, then the output of the comparator 117 will be high and solenoid 124 will cause switch 97 to be positioned such that line 68 is coupled to line 13. If the voltage on line 116 is greater than the voltage on line 121, then the output of comparator 117 will be low and solenoid 124 will cause switch 97 to be in a position to couple line 125 to line 13. The output of multiplier 122 which represents a proportionality constant k is coupled over line 126 to an input of multiplier 114. The output of multiplier 114 is coupled over line 127 to an input of adder 107. The output of adder 107 is coupled over line 128 to an input of adder 129. Adder 129 has a second input coupled over line 57. The output of adder 129 is coupled over line 130 to an input of normalizer 131. The output of normalizer 131 is coupled over line 125 to one side of switch 97.

In operation, accelerator limiter 90 receives the current antenna position command on line 68 from rate limiter 55. The previous antenna position command on line 13 at time $T_{n-1}$ is stored in delay 98 and provided on line 57. The antenna position commands on line 68 and 57 are subtracted from one another to provide a difference vector on line 105 which is representative of vector 42 $\vec{D}_n'$ in FIG. 3A. Two previous position commands at times $T_{n-2}$ and $T_{n-1}$ which were on line 13 are subtracted in adder 99 to determine the difference vector $\vec{D}_o'$ which corresponds to vector 92 in FIG. 3A. The difference vector is stored in delay 108 and is provided on line 109 to adder/subtractor 106 which determines the acceleration or difference between the difference vectors $\vec{D}_n'$ and $\vec{D}_o'$. The difference corresponds to the subtraction of vector 42 and 92 in FIG. 3B. The magnitude of the difference $\Delta\vec{D}$ is determined in vector magnitude 112. The magnitude of $\Delta\vec{D}$ is indicative of the acceleration through which the antenna would experience if the antenna position command at time $T_n$ on line 68 is coupled to the antenna drive unit 14. The maximum allowable acceleration $\Delta_{max}$ is determined by the voltage from voltage source 120 which is compared with the magnitude of the acceleration. If the acceleration is less than or equal to the maximum allowable acceleration then the antenna position command on line 68 is coupled to the antenna drive unit 14. However, if the acceleration on line 116 is greater than the maximum allowable acceleration, then further processing is required to generate a position command within acceptable acceleration limits.

The magnitude of the acceleration signal $\Delta\vec{D}$ is divided into the maximum allowable acceleration $\Delta_{max}$ to provide a constant k on line 126. The constant which is less than one is multiplied by the acceleration vector $\Delta\vec{D}$ to provide a shortened or lesser acceleration vector on line 127. Adder 107 adds the acceleration vector $k\Delta D$ to the difference vector $\vec{D}_o'$ to provide $\vec{D}_N''$, vector 93 shown in FIG. 3C. The output of adder 107, $\vec{D}_N''$ is added to antenna position command at time $T_{n-1}$, vector 38, to provide a modified antenna position command vector 94 at time $T_n$ which will limit the acceleration of the antenna. The antenna position command is normalized by normalizer 131 to provide a unit direction vector 94' on line 125 which is coupled through switch 97 to line 13.

The antenna response may be further modified by treating the constants sin $\theta_{max}$ and $\Delta_{max}$ as variables. The antenna may be damped or slowed down as it arrives to a desired position by storing the prior unlimited position command signals on line 12 of FIG. 1 and deaccelerating antenna 15 by reducing $\Delta_{max}$ as a function of the distance from the desired position command or gimbal boundary.

Figure 4:
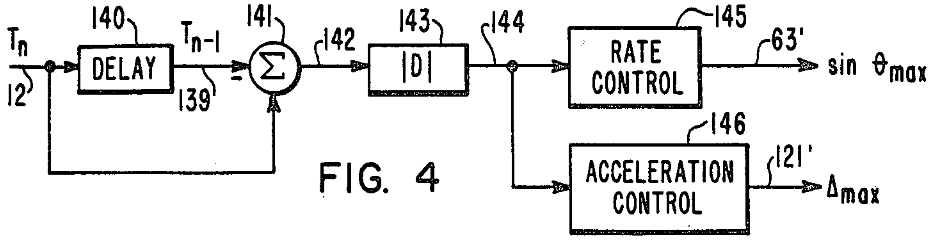
FIGS. 4 and 5 provide variable rate and acceleration limits to the embodiment of FIG. 1.

Referring to FIG. 4, two antenna position commands are received on line 12 which pass through delay 140 which may have a time delay of one time interval. The difference between two consecutive position command signals are determined in adder/subtractor 141. The output of adder 141 is an indication of the difference between two position commands separated by a time interval. The output of adder 141 is coupled over line 142 to vector magnitude 143 which determines the magnitude of the difference vector on line 142. The magnitude of difference vector is provided over line 144 to rate control 145 and acceleration control 146. Rate control provides a voltage as a function of the signal on line 144 indicative of sin $\theta_{max}$ on its output line 63'. Line 63' may be substituted for line 63 and voltage source 64 in FIG. 1. Acceleration control 146 provides an output signal $\Delta_{max}$ which is a function of the signal on line 144. The output of acceleration control 146, line 121' may be substituted in place of voltage source 120 and line 121 in FIG. 1. By using the apparatus in FIG. 4, $\theta_{max}$ and $\Delta_{max}$ may be a variable having a value as a function of the difference between two position commands on line 12 of FIG. 1.

The final position commands on line 12 may be initially processed to provide the axial component such as in the YZ plane. The axial component may indicate gimbal limits and can be used for input to rate control 145 and acceleration control 146. The axial component may be preferable to use to slow the antenna when approaching a gimbal boundary.

Figure 5:
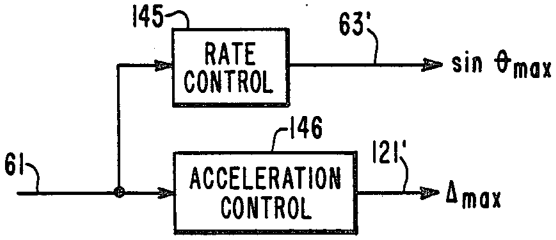

Referring to FIG. 5, an alternate arrangement is shown where the signal on line 61 from FIG. 1 is used as an input to rate control 145 and acceleration control 146. The signal on line 61 is indicative of the magnitude of the difference between the last antenna position command to the antenna and the unlimited desired position command on line 12.

Figure 6:
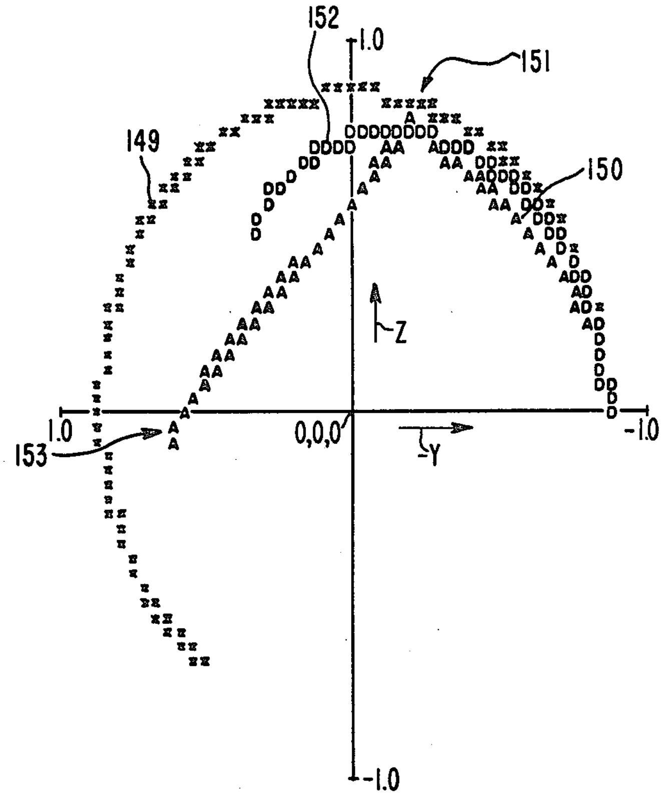
FIGS. 6 and 7 are graphs showing the response of an antenna to position commands utilizing the embodiment of FIG. 1 compared to a response without the embodiment of FIG. 1.
Figure 7:
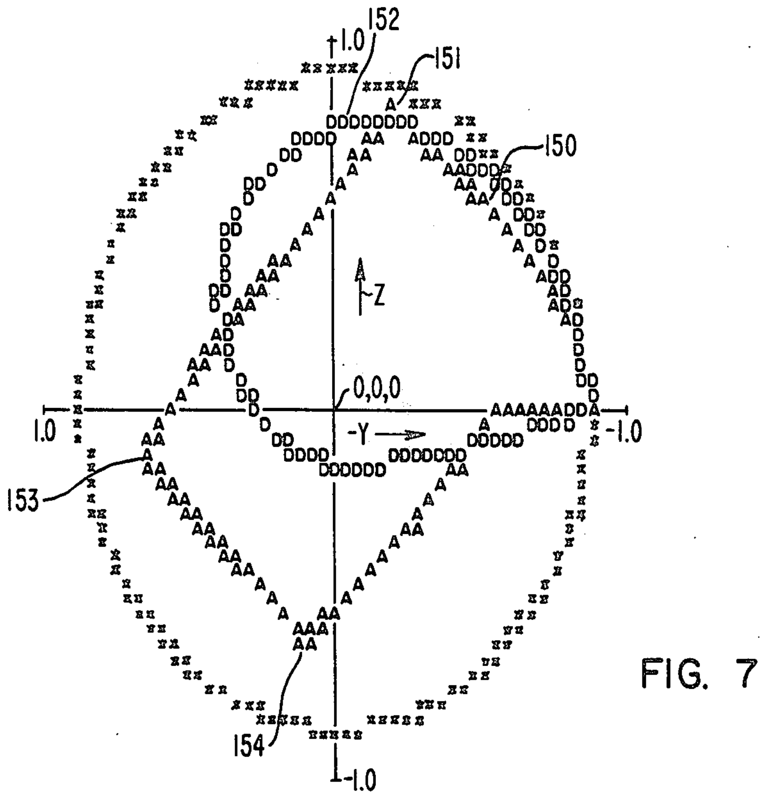

A computer simulation was performed simulating the embodiment of FIG. 1 to compare the performance of the embodiment of FIG. 1 with other techniques for preventing the antenna from hitting the gimbal stops. FIGS. 6 and 7 are graphs showing the response of an antenna to a sequence of position commands utilizing the embodiment of FIG. 1 compared to a response utilizing independent rate limiting in elevation and azimuth. In FIGS. 6 and 7, the ordinate represents direction along the Z coordinate or elevation and the abscissa represents the direction along the −Y coordinate or azimuth. The simulation of FIGS. 6 and 7 are for an antenna mounted in the nose of an aircraft which rolls about its longitudinal axis while the antenna is directed at a forward target at an angle off the longitudinal axis of the airplane. Initially, the antenna is at a wide angle in a space stabilized mode directed at a target or point and then attempts to stay on the point during the roll of the aircraft about its longitudinal axis. Under these conditions, the antenna servos are being commanded at high rates in azimuth and elevation simultaneously. Under this condition, an azimuth and elevation rate limiter will saturate in both azimuth and elevation. The antenna is driven as shown by curve 150 in a straight line. If the rate in azimuth and elevation does not become unsaturated before approaching the gimbal limit, the momentum or inertia of the antenna could cause the antenna to hit the gimbal stop at point 151. In any case, the antenna is not in an optimum position for recovery to the desired position. In FIGS. 6 and 7, curve 149 shows the desired sequence of antenna position commands on line 12 of FIG. 1. The letter D shows each position command of a sequence on line 13 of the embodiment of FIG. 1. The letter A forming curve 150 shows the sequence of antenna position commands for independent azimuth and elevation rate limits, a technique previously applied to control the antenna. In FIGS. 6 and 7, the aircraft rolled at a rate of 170° per second. Referring to FIG. 6, point 151 on curve 150 shows that the independent azimuth and elevation rate limiter technique would be beyond timely recovery to respond to the corner in its calculated path because of acceleration limits and inertia of the antenna, but curve 152 has already moved to the inside, away from the gimbal stop always towards the desired point shown by the asterisks of curve 149. Point 153 on curve 150 shows that the azimuth-elevation limiter had lost its direction towards a desired point.

Figure 8:
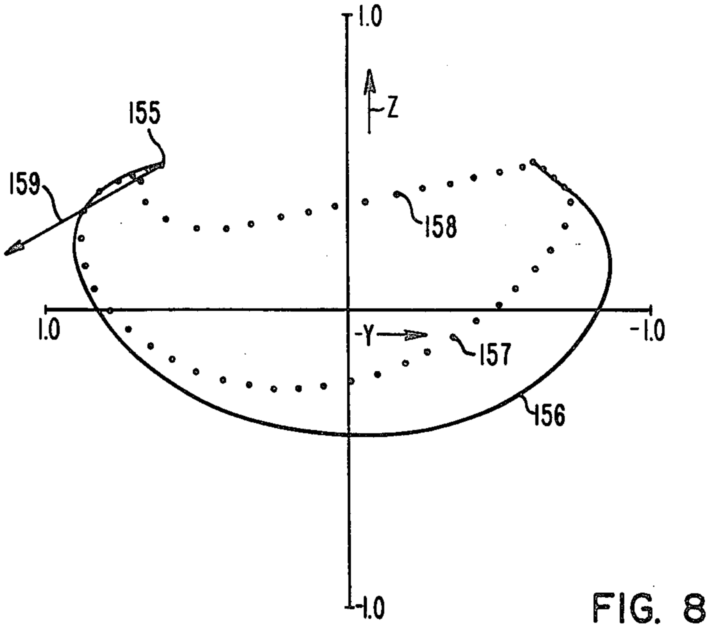
FIG. 8 is a graph showing the response of an antenna to position commands utilizing the embodiment of FIG. 1 at two antenna rate limits.

FIG. 7 shows the simulation carried out for a longer time period with the airplane continuing to roll at 170° per second. Point 154 on curve 150 shows that the antenna having independent azimuth and elevation rate limits has undergone a recovery in direction trying to pursue the desired position command. Curve 152 shows that the antenna is moved in pursuit towards the desired position command without travelling into the gimbal stops. FIG. 8 is a hand generated graph showing the response of an antenna to position commands utilizing equations 1 to 5. In FIG. 8, the ordinate represents elevation and the abscissa represents azimuth. In FIG. 8, the antenna position is originally at point 155 while the aircraft rolls about its longitudinal axis as in FIGS. 6 and 7. Curve 156 shows the sequence of target positions as the airplane makes its maneuver. Curve 157 shows the sequence of antenna position commands on line 13 from the embodiment of FIG. 1 during the aircraft maneuver. Curve 158 shows the path of the sequence of antenna position commands when the aircraft roll rate is increased by a factor of five. Curve 159 shows the sequence of antenna position commands when the rate of antenna movement is unlimited. As can be seen by curve 159 with an unlimited rate, the antenna is commanded in the wrong direction and would hit the gimbal stop. As the rate of traversing an arbitrary path using the embodiment of FIG. 1 increases, the antenna position commands on line 13 direct the antenna to cut more sharply across the corner, always maintaining the direction towards the desired point.

Figure 10:
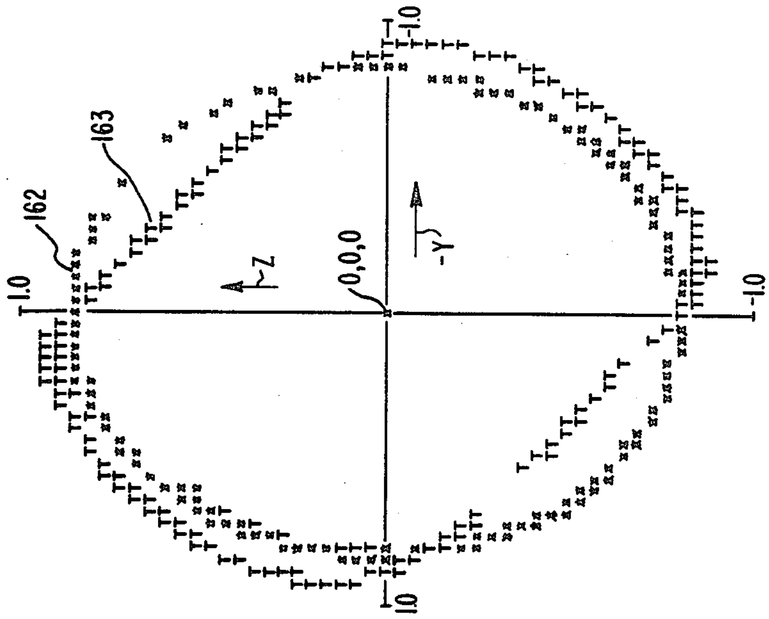
FIGS. 9 and 10 are graphs showing the response of an antenna to position commands utilizing the embodiment of FIG. 1.
Figure 9:
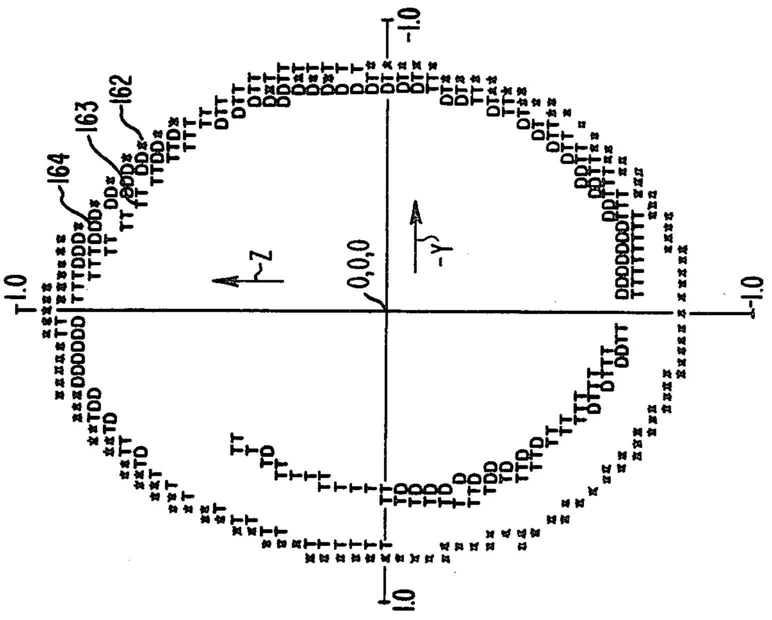

FIGS. 9 and 10 are graphs showing the response of an antenna to a sequence of position commands. In FIGS. 9 and 10, the ordinate represents elevation and the abscissa represents azimuth with the center of the graph corresponding to the position of the longitudinal axis of the aircraft which is orthogonal to the ordinate and abscissa. In FIG. 9, the antenna is positioned towards a target at a 55° aspect angle to the longitudinal axis. As the airplane rolls about its longitudinal axis, the antenna is positioned to avoid the gimbal stops. In FIGS. 9 and 10, curve 162 formed by the asterisks represent the sequence of desired position commands, curve 163 formed by the T's represent the sequence of positions of the antenna. Curve 164 formed by the D's represent the sequence of position commands utilizing the embodiment of FIG. 1.

FIG. 10 shows the antenna at a 55° aspect angle without the embodiment of FIG. 1 where the antenna is shown hitting the gimbal stops as the airplane rolls about its longitudinal axis.

The antenna has no rate limit in elevation and a 400°/second rate limit in azimuth. The gimbal stops are at 60° aspect angle while the position commands are limited to a maximum aspect angle of 58.5° to provide a buffer zone. Since a unit direction vector is used, the projection of the gimbal stop on the graph of FIGS. 9 and 10 for an aspect angle of 60° is sin 60° or 0.866. The projection of the buffer zone on FIGS. 9 and 10 for an aspect angle of 58.5° is sin 58.5 or 0.853.

Figure 11:
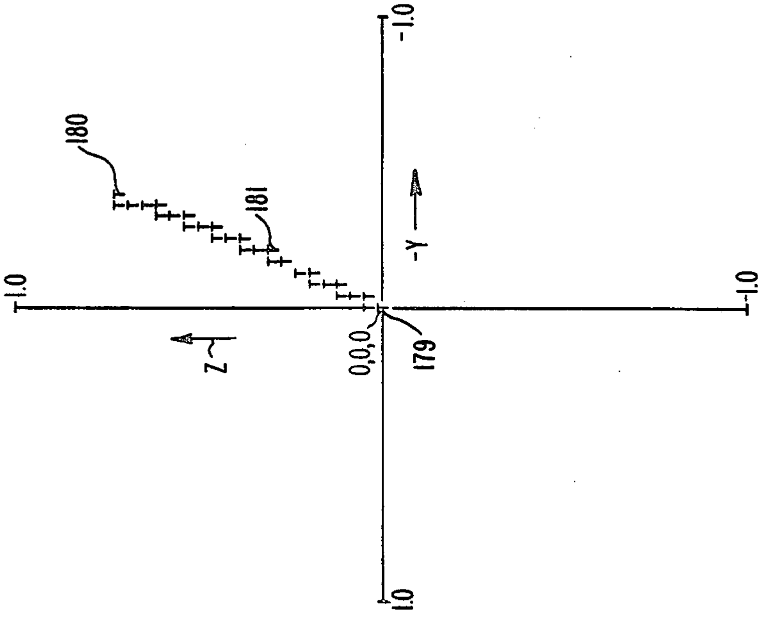
FIG. 11 is a graph showing the response of an antenna to position commands utilizing the embodiment of FIG. 1.

FIG. 11 is a graph showing the response of an antenna to position commands utilizing the embodiment of FIG. 1. In FIG. 11, the ordinant represents elevation and the abscissa represents azimuth where the longitudinal axis of the airplane passes through the center of the graph orthogonal to the ordinate and abscissa. FIG. 11 shows a case where the antenna is commanded to a position from boresight which normally is aligned with the longitudinal axis of the aircraft. Therefore, in FIG. 11, the antenna was originally positioned as shown by point 179 at the center of the graph and approaches a point in space 180 along curve 181.

Figure 12:
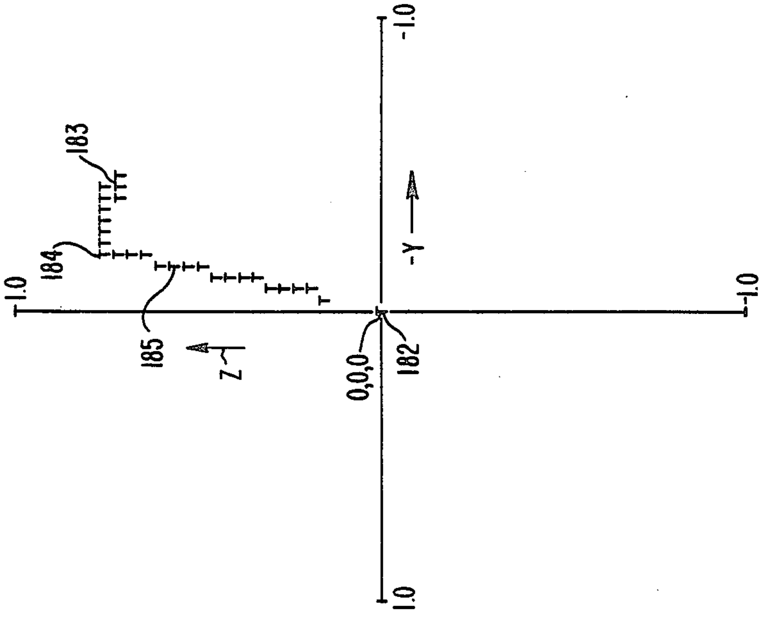
FIG. 12 ia a graph showing the response of an antenna to position commands without the embodiment of FIG. 1.

In contrast, FIG. 12 is a graph showing response of an antenna to position commands without the use of the embodiment of FIG. 1. In FIG. 12, the ordinant represents elevation, Z axis, and the abscissa represents azimuth, −Y axis. The antenna as originally positioned on boresight at point 182 and is directed to a point in space at point 183. The actual sequence of antenna positions are shown by curve 185, the sequence of letter T's on the graph. As can be seen, the antenna is rate limited in the azimuth direction while unlimited in the elevation direction, therefore, the rate in the elevation direction far exceeds the rate in the azimuth direction causing the antenna to reach the elevation coordinate value at point 184 followed by a time interval when the antenna is moved in the azimuth direction to point 183. FIG. 11 shows the antenna moving directly to the desired point 180. In FIG. 12, the antenna actually travels further in reaching point 183 and depending on the maximum rates which may be unlimited in FIG. 12, the antenna may actually take more time and traverse a longer path in reaching point 183 and oscillate before settling.

An apparatus and method has been described for controlling the point-to-point positioning of a device such as an antenna by controlling the position commands and the space therebetween to limit the rate of movement and the acceleration of the device by repositioning or substituting position commands. To limit the rate, the substituted position command is between the desired point and the past position command so that the antenna always moves in the desired direction but the distance moved is limited which thereby limits the rate of movement. The acceleration of the antenna is controlled by limiting the change in rate permissible by substituting a position command having acceptable rate changes. The rate of change may be longitudinal or lateral to the past movement. A unit vector was described for each position command having a locus of points on a hemisphere representing a direction in space emanating from the center of the hemisphere. The direction of travel was determined by subtracting the position command unit vector from one another to determine movement along a great circle path on the hemisphere. An apparatus and method for damping the movement of an antenna was also described wherein the maximum rate and maximum acceleration limits were made variables to slow the antenna down as it reached a desired position thereby preventing its oscillation about the desired position.

We claim:

1. Apparatus for controlling the rate of movement of a device positioned by at least one actuator being responsive to each of a sequence of position commands separated by discrete time intervals comprising:

first means for determining the magnitude of the difference between first and second position commands to provide a first signal indicative of the distance between said first and second position commands, second means for comparing said first signal with a predetermined constant, third means for coupling said second position command to said device at times said first signal is less than or equal to said predetermined constant, fourth means for generating a scaling factor as a function of said first signal and said predetermined constant, fifth means for multiplying said scaling factor by the difference vector formed by the subtraction of said first and second position commands to form a shortened difference vector, sixth means for adding said shortened difference vector to said first position command to form a third position command intermediate said first and second position commands, and seventh means for coupling said third position command to said device at times said first signal is greater than said predetermined constant.

2. The apparatus of claim 1 wherein said device is an antenna pivotable about two axes.

3. The apparatus of claim 2 wherein said sequence of position commands are expressed as unit vectors in a coordinate system.

4. The apparatus of claim 3 wherein said unit vectors originate from a common origin to provide position commands which are located with respect to the coordinates of said co-ordinate system.

5. The apparatus of claim 4 wherein said co-ordinate system includes 3 co-ordinate axes X,Y,Z, orthogonal to each other.

6. The apparatus of claim 5 wherein said position commands define a locus of points on a spherical surface and wherein the path length between two position commands is a straight line between said first and second position commands.

7. The apparatus of claim 1 further including means for normalizing said third position command to form a unit vector and wherein said sequence of position commands are unit vectors.

8. Apparatus for controlling the rate of movement of an antenna with respect to its supporting structure wherein the antenna includes one or more actuators for positioning the antenna with respect to its supporting structure in response to a sequence of position commands occurring at discrete time intervals and wherein the position commands may be represented as unit vectors in a co-ordinate system comprising:

means for taking the difference between first and second position commands in said sequence to form a difference vector, means for determining the magnitude of said difference vector to form a first signal, means for comparing said first signal with a predetermined constant, means for coupling said second position command to said actuators at times said first signal is less than or equal to said predetermined constant, means for generating a scaling factor as a function of said first signal and said predetermined constant, means for multiplying said scaling factor by said difference vector to form a shortened difference vector, means for adding said shortened difference vector to said first position command to form a third position command, means for normalizing said third position command to form a fourth position command, and means for coupling said fourth position command to said actuators at times said first signal is greater than said predetermined constant.

9. The apparatus of claim 8 wherein said means for generating a scaling factor includes means for dividing said predetermined constant by a function of said first signal.

10. The apparatus of claim 9 wherein said function of said first signal is [1+(value of first signal×0.51424)$^4$] multiplied by the value of said first signal.

11. The apparatus of claim 8 wherein said position commands define a locus of points on a spherical surface.

12. The apparatus of claim 11 wherein said rate of movement is represented by the path length between two position commands along the great circle divided by the time interval between the two position commands.

13. A method for limiting the rate of a device mechanically positioned by at least one actuator in response to at least first and second position commands spaced apart by a first predetermined time interval comprising the steps of:

subtracting said first position command from said second position command to provide a first difference signal;

comparing the magnitude of said first difference signal with a predetermined constant;

coupling said second position command to said actuator at times said magnitude of said first difference signal is less than or equal to said predetermined constant;

generating a first scaling signal as a function of the magnitude of said first difference signal;

multiplying said first difference signal by said first scaling signal to provide a second difference signal smaller than said first difference signal;

adding said second difference signal to said first position command to form a third position command; and coupling said third position command to said actuator at times said magnitude of said first difference signal is greater than said predetermined constant.

14. The method of claim 13 wherein said step of generating a first scaling signal includes the step of dividing said predetermined constant by a function of said first signal.

15. The method of claim 14 wherein said first function is [1×(value of first signal×0.51424)$^4$] multiplied by the value of said first signal.

16. The method of claim 13 wherein said first and second position commands are expressed as unit vectors in a co-ordinate system.

17. The method of claim 16 wherein said unit vectors originate from a common origin to provide position commands which are located with respect to the co-ordinates of said co-ordinate system.

18. The method of claim 17 wherein said co-ordinate system includes 3 co-ordinate axes X,Y,Z orthogonal to each other.

19. The method of claim 18 wherein said position commands define a locus of points on a sphere and wherein the path length between two position commands is a straight line beneath the great circle path between said first and second position commands.

20. The method of claim 13 further including the step of arithmetically adjusting the magnitude of said third position command to a predetermined magnitude.

21. Apparatus for limiting the acceleration of a device mechanically positioned by at least one actuator in response to at least first, second and third consecutive position commands spaced apart by first and second predetermined time intervals comprising:

first means for subtracting said first and second position commands to provide a first difference signal indicative of the change in position during said first predetermined time interval;

second means for subtracting said second and third position commands to provide a second difference signal indicative of the change in position during said second predetermined time interval;

third means for subtracting said first and second difference signals to provide a first acceleration signal;

fourth means for comparing the magnitude of said first acceleration signal with a predetermined constant;

fifth means for coupling said third position command to said actuator at times said magnitude of said first acceleration signal is less than or equal to said predetermined constant;

sixth means for generating a first scaling signal as a function of the magnitude of said first acceleration signal;

seventh means for multiplying said first acceleration signal by said first scaling signal to provide a second acceleration signal smaller than said first acceleration signal;

eighth means for adding said second acceleration signal to said first difference signal to form a third difference signal;

ninth means for adding said third difference signal to said second position command to form a fourth position command;

tenth means for coupling said fourth position command to said actuator at times said magnitude of said first acceleration signal is greater than said predetermined constant.

22. The apparatus of claim 21 wherein said means for generating a first scaling signal includes eleventh means for dividing said predetermined constant by the magnitude of said first acceleration signal.

23. The apparatus of claim 21 wherein said first, second and third position commands indicate a position in a co-ordinate system having a plurality of co-ordinates.

24. The apparatus of claim 21 wherein said first, second and third position commands indicate a direction in a co-ordinate system having a plurality of co-ordinates and wherein said first, second and third position commands originate from a common coordinate position.

25. The apparatus of claim 24 wherein said first, second and third position commands have a predetermined magnitude.

26. The apparatus of claim 25 further including eleventh means for arithmetically adjusting the magnitude of said fourth position command to said predetermined magnitude.

27. The apparatus of claim 26 wherein said predetermined magnitude is 1 to provide unit vectors and wherein said position commands originate from 0,0,0 in a co-ordinate system having X,Y,Z co-ordinates.

28. The apparatus of claim 21 wherein said actuator rotates said device about at least one axis.

29. The apparatus of claim 21 wherein said device is a radar antenna and said actuator is a first and second servo motor for rotating said antenna about a first and second axis.

30. A method for limiting the acceleration of a device mechanically positioned by at least one actuator in response to at least first, second and third consecutive position commands spaced apart by first and second predetermined time intervals comprising the steps of:

subtracting said first and second position commands to provide a first difference signal indicative of the change in position during said first predetermined time interval;

subtracting said second and third position commands to provide a second difference signal indicative of the change in position during said second predetermined time interval;

subtracting said first and second difference signals to provide a first acceleration constant;

comparing the magnitude of said first acceleration signal with a predetermined constant;

coupling said third position command to said actuator at times said magnitude of said first acceleration signal is less than or equal to said predetermined constant;

generating a first scaling signal as a function of the magnitude of said first acceleration signal;

multiplying said first acceleration signal by said first scaling signal to provide a second acceleration signal smaller than said first acceleration signal;

adding said second acceleration signal to said first difference signal to form a third difference signal;

adding said third difference signal to said second position command to form a fourth position command;

coupling said fourth position command to said actuator at times said magnitude of said first acceleration signal is greater than said predetermined constant.

31. The method of claim 30 wherein said step for generating a first scaling signal includes the step of dividing said predetermined constant by the magnitude of said first acceleration signal.

32. The method of claim 30 wherein said first, second and third position commands indicate a position in a co-ordinate system having a plurality of co-ordinates.

33. The method of claim 30 wherein said first, second and third position commands indicate a direction in a co-ordinate system having a plurality of co-ordinates and wherein said first, second and third position commands originate from a common co-ordinate position.

34. The method of claim 33 wherein said first, second and third position commands have a predetermined magnitude.

35. The method of claim 34 further including the step of arithmetically adjusting the magnitude of said fourther position command to said predetermined magnitude.

36. The method of claim 35 wherein said predetermined magnitude is 1 to provide unit vectors and wherein said position commands originate from 0,0,0 in a co-ordinate system having X,Y,Z co-ordinates.

37. The method of claim 30 wherein said actuator rotates said device about at least one axis.

38. The method of claim 30 wherein said device is a radar antenna and said actuator includes a first and second servo motor for rotating said antenna about a first and second axis.

39. The method of claim 30 further including the step of limiting the rate of movement of the device.

40. The apparatus of claim 1 further including means for limiting the acceleration of the device.

41. The apparatus of claim 21 further including means for limiting the rate of movement of the device.

42. The method of claim 13 further including the step of limiting the acceleration of the device.

43. The apparatus of claim 21 further including eleventh means for modifying said predetermined constant between said first and second predetermined time intervals.

* * * * *